US007533095B2

(12) United States Patent
Ramsey et al.

(10) Patent No.: US 7,533,095 B2
(45) Date of Patent: May 12, 2009

(54) DATA MINING WITHIN A MESSAGE HANDLING SYSTEM

(75) Inventors: Mark S. Ramsey, Colleyville, TX (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 11/109,446

(22) Filed: Apr. 19, 2005

(65) Prior Publication Data

US 2006/0248033 A1  Nov. 2, 2006

(51) Int. Cl.
*G06F 7/00* (2006.01)
(52) U.S. Cl. .......................................... 707/6; 707/102
(58) Field of Classification Search ........................ None
See application file for complete search history.

(56) References Cited

U.S. PATENT DOCUMENTS

| 6,029,195 | A | 2/2000 | Herz |
| 6,058,389 | A * | 5/2000 | Chandra et al. ................. 707/1 |
| 6,272,478 | B1 * | 8/2001 | Obata et al. .................... 706/12 |
| 6,393,387 | B1 | 5/2002 | Adriaans et al. |
| 6,470,352 | B2 | 10/2002 | Yaginuma ..................... 707/102 |
| 6,567,814 | B1 | 5/2003 | Bankier et al. |
| 6,571,274 | B1 | 5/2003 | Jacobs et al. |
| 6,631,361 | B1 * | 10/2003 | O'Flaherty et al. .............. 706/47 |
| 6,643,646 | B2 * | 11/2003 | Su et al. .......................... 707/6 |
| 6,782,375 | B2 | 8/2004 | Abdel-Moneim et al. |
| 7,082,420 | B2 * | 7/2006 | Lo ............................... 706/25 |
| 7,299,158 | B2 * | 11/2007 | Behkami et al. .............. 702/188 |
| 2003/0187741 | A1 * | 10/2003 | Brown et al. .................. 705/14 |
| 2003/0220860 | A1 | 11/2003 | Heytens et al. |
| 2003/0220901 | A1 * | 11/2003 | Carr et al. ....................... 707/1 |
| 2003/0236700 | A1 | 12/2003 | Arning et al. |

(Continued)

FOREIGN PATENT DOCUMENTS

WO  WO 01/22265 A2  3/2001

(Continued)

OTHER PUBLICATIONS

Wang et al.; ReCoM: Reinforcement Clustering of Multi-Type Interrelated Data Objects;SIGIR'03, Jul. 28-Aug. 1, 2003, Toronto, Canada. Copyright 2003 ACM 1-58113-646-3/03/007 pp. 274-281.

*Primary Examiner*—Neveen Abel Jalil
*Assistant Examiner*—Son T Hoang
(74) *Attorney, Agent, or Firm*—Schmeiser, Olsen & Watts; John R. Pivnichny

(57) ABSTRACT

A method, system, computer program product, and process for data mining within a message handling system in a computer system. The message handling system includes a message broker and queues. The message broker implements the method. An executing data mining algorithm operates upon a data mining model that depends on model parameters and on data values for independent variables published to the queues by at least one publisher. The data mining algorithm utilizes the model parameters and data values to generate at least one score. A decision algorithm applies at least one rule to the at least one score to generate at least one decision. The at least one score and/or at least one decision is published in a result queue. The at least one result is transmitted to at least one subscriber.

11 Claims, 13 Drawing Sheets

U.S. PATENT DOCUMENTS

| | | |
|---|---|---|
| 2004/0039548 A1 | 2/2004 | Selby et al. |
| 2004/0049478 A1* | 3/2004 | Jasper et al. .................. 707/1 |
| 2004/0098358 A1 | 5/2004 | Roediger |
| 2004/0111384 A1 | 6/2004 | Shin et al. |
| 2004/0111464 A1 | 6/2004 | Ho et al. |

FOREIGN PATENT DOCUMENTS

| | | |
|---|---|---|
| WO | WO 03/036425 A2 | 5/2003 |
| WO | WO 03/090122 A2 | 10/2003 |

* cited by examiner

DATA MINING WITHIN A MESSAGE HANDLING SYSTEM

BACKGROUND OF THE INVENTION

1. Technical Field

The present invention relates to data mining within a message handling system.

2. Related Art

Data mining is being increasingly used for developing business strategies and solving business problems. Data mining is a technique that can intelligently and automatically transform data into useful information. Data mining searches for relationships and global patterns that exist in the data comprised by one or more databases. Data mining determines from modeling the data in the one or more databases potentially useful information (e.g., rules, constraints, correlations, patterns, signatures and irregularities). Data mining provides prediction and description. Prediction involves using variables or fields in the one or more databases to predict unknown or future values of other variables of interest. Description focuses on finding interpretable patterns that describe the data in the one or more databases. The relative importance of prediction and description for particular data mining applications may vary among different applications.

A data mining method may analyze customer transactions for patterns or association rules which help make business decisions (e.g., choose sale items, design coupons, arrange shelves, etc.). For example, data mining can be performed by a company relative to its customer database to determine, based on customer data stored in the database, which customers are most likely to be good candidates for a new product, and focus marketing efforts on these customers. Data mining may determine whether to market the new product to the customer.

Unfortunately current usage of data mining is inefficient for accommodating new data to which data mining algorithms are applied and for distributing the results of data mining calculations. Thus, there is a need for a method and system characterized by improved efficiency for accommodating new data to which data mining algorithms are applied and/or for distributing the results of data mining calculations, as compared with usage of data mining in the related art.

SUMMARY OF THE INVENTION

The present invention provides a data mining method adapted to be performed in a computer system having a message handling system therein, said message handling system comprising a message broker and a plurality of queues that include computer-readable memory, said method comprising:

receiving information in at least one queue of the plurality of queues, said information being received from at least one publisher;

executing a data mining algorithm by operating upon a data mining model that depends on model parameters and on data values for independent variables, said information comprising input data that includes the data values and further includes the model parameters, model content, or combinations thereof, said model content being the data mining model or an identifier thereof or a pointer thereto, said executing comprising utilizing the information to generate at least one score;

executing a decision algorithm to apply at least one rule to the at least one score to generate at least one decision;

publishing at least one result in a result queue of the plurality of queues, said at least one result being selected from the group consisting of the at least one score, the at least one decision, and combinations thereof, said result queue being subscribed to by at least one subscriber; and transmitting the at least one result from the result queue to the at least one subscriber, wherein said receiving, said executing the data mining algorithm, said executing the decision algorithm, said publishing, and said transmitting are performed by the message broker.

The present invention provides a system for data mining, said system comprising:

a message handling system comprising a message broker and a plurality of queues that include computer-readable memory, said message handling system being in a computer system, at least one queue of the plurality of queues adapted to receive information from at least one publisher;

a data mining algorithm adapted be executed by a processor of the computer system and further adapted to operate upon a data mining model that depends on model parameters and on data values for independent variables, said information comprising input data that includes the data values and further includes the model parameters, model content, or combinations thereof, said model content being the data mining model or an identifier thereof or a pointer thereto, said data mining algorithm further adapted to utilize the information to generate at least one score, a decision algorithm adapted to apply at least one rule to the at least one score to generate at least one decision;

means for publishing at least one result in a result queue of the plurality of queues, said at least one result being selected from the group consisting of the at least one score, the at least one decision, and combinations thereof, said result queue being subscribed to by at least one subscriber; and means for transmitting the at least one result from the result queue to the at least one subscriber, wherein receipt of the information in the plurality of queues, execution of the data mining algorithm, application of the at least one rule by the decision algorithm, said publishing, and said transmitting are adapted to be performed by the message broker.

The present invention provides a computer program product, comprising a computer usable medium having a computer readable program code embodied therein, said computer readable program code comprising an algorithm adapted to implement a data mining method in a computer system that comprises a message handling system, said message handling system comprising a message broker and a plurality of queues that includes computer-readable memory, said method comprising:

providing, in a computer system, a message handling system comprising a message broker and a plurality of queues that include computer-readable memory;

receiving information in at least one queue of the plurality of queues, said information being received from at least one publisher;

executing a data mining algorithm by operating upon a data mining model that depends on model parameters and on data values for independent variables, said information comprising input data that includes the data values and further includes the model parameters, model content, or combinations thereof, said model content being the data mining model or an identifier thereof or a pointer thereto, said executing comprising utilizing the information to generate at least one score;

executing a decision algorithm to apply at least one rule to the at least one score to generate at least one decision;

publishing at least one result in a result queue of the plurality of queues, said at least one result being selected from the group consisting of the at least one score, the at least one decision, and combinations thereof, said result queue being subscribed to by at least one subscriber; and transmitting the at least one result from the result queue to the at least one subscriber, wherein said receiving, said executing the data mining algorithm, said executing the decision algorithm, said publishing, and said transmitting are performed by the message broker.

The present invention provides a process for deploying computing infrastructure, comprising integrating computer-readable code into a computer system having a message handling system therein, said message handling system comprising a message broker and a plurality of queues that include computer-readable memory, wherein the code in combination with the computer system is capable of performing a method comprising:

receiving information in at least one queue of the plurality of queues, said information being received from at least one publisher;

executing a data mining algorithm by operating upon a data mining model that depends on model parameters and on data values for independent variables, said information comprising input data that includes the data values and further includes the model parameters, model content, or combinations thereof, said model content being the data mining model or an identifier thereof or a pointer thereto, said executing comprising utilizing the information to generate at least one score;

executing a decision algorithm to apply at least one rule to the at least one score to generate at least one decision;

publishing at least one result in a result queue of the plurality of queues, said at least one result being selected from the group consisting of the at least one score, the at least one decision, and combinations thereof, said result queue being subscribed to by at least one subscriber; and transmitting the at least one result from the result queue to the at least one subscriber, wherein said receiving, said executing the data mining algorithm, said executing the decision algorithm, said publishing, and said transmitting are performed by the message broker.

The present invention advantageously provides a method and system characterized by improved efficiency for accommodating new data to which data mining algorithms are applied and/or for distributing the results of data mining calculations, as compared with usage of data mining in the related art.

DETAILED DESCRIPTION OF THE INVENTION

The present invention utilizes a message handling system to advantageously provide improved efficiency for accommodating new data to which data mining algorithms are applied and/or for distributing the results of data mining calculations, as compared with usage of data mining in the related art.

A message handling system routes messages (e.g., data) from one location to another within a computer network, which may result in significant business gains. An application of data mining models (e.g., models utilizing regression) would allow scores to be developed which may be used for a diverse set of business activities such as customer relationship management, fraud detection, and early equipment failures.

A message handling system receives data from publishers. Such data received by the message handling system from the publishers are called "published data". The message handling system distributes messages, called "subscriptions", comprising the published data to subscribers. The publishers may not be concerned with the destination of their published data, and the subscribers may not be concerned with the source(s) of the messages they receive from the message handling system.

In practice, a message broker within the message handling system assures the integrity of the message source and manages the distribution of the message according to the valid subscriptions registered in the message handling system. Publishers and subscribers may also interact with a network of message brokers, wherein each message broker propagates subscriptions and forwards publications to other brokers within the network. Therefore, the term "broker" or "message broker" is used herein to denote either a single message broker or multiple message brokers working together as a network to provide brokering services within the framework of a message handling system.

Deploying data mining models within a message handling system may be beneficial in various ways, such as: efficient timing for message transport; efficient aggregation of information intended for disparate computer systems and/or applications; and an ability to publish changes to a data mining model on an on-demand basis to a variety of applications.

Figure 1:
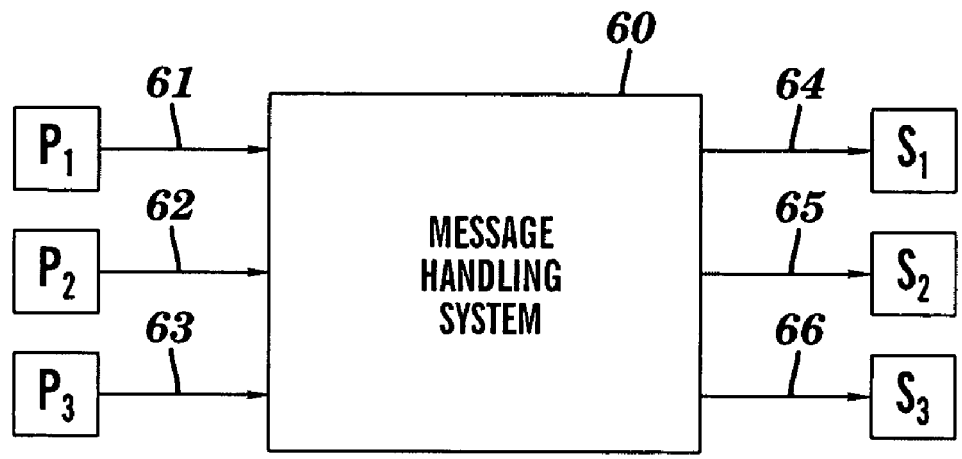
FIG. 1 depicts a message handling system coupled to publishers and subscribers, in accordance with embodiments of the present invention.

FIG. 1 depicts a message handling system 60 coupled to publishers ($P_1$, $P_2$, $P_3$) and subscribers ($S_1$, $S_2$, $S_3$), in accordance with embodiments of the present invention. The publishers ($P_1$, $P_2$, $P_3$) each adapted to publish data to the message handling system 60, and the subscribers ($S_1$, $S_2$, $S_3$) are each adapted to receive messages (i.e., subscriptions) from the message handling system 60. The directional arrows 61, 62, and 63, pointing from $P_1$, $P_2$, and $P_3$ to the message handling system 60, respectively denote that $P_1$, $P_2$, and $P_3$ are publishers. The directional arrows 64, 65, and 66, pointing from the message handling system 60 to $S_1$, $S_2$, and $S_3$, respectively denote that $S_1$, $S_2$, and $S_3$ $P_3$ are subscribers.

Although FIG. 1 depicts the three publishers $P_1$, $P_2$, and $P_3$, the present invention generally includes one or more publishers coupled to the message handling system 60, and the one or more publishers may be a plurality of publishers. Although FIG. 1 depicts the three publishers $P_1$, $P_2$, and $P_3$ as being external to the message handling system 60, the scope of the present invention permits: all publishers to be external to the message handling system 60, all publishers to be within the message handling system 60, or some publishers to be external to the message handling system 60 and other publishers to be within the message handling system 60.

Although FIG. 1 depicts the three subscriber $S_1$, $S_2$, and $S_3$, the present invention generally includes one or more subscriber coupled to the message handling system 60, and the one or more subscribers may be a plurality of subscribers. Although FIG. 1 depicts the three subscribers $S_1$, $S_2$, and $S_3$ as being external to the message handling system 60, the scope of the present invention permits: all subscribers to be external to the message handling system 60, all subscribers to be within the message handling system 60, or some subscribers to be external to the message handling system 60 and other subscribers to be within the message handling system 60.

Figure 2:
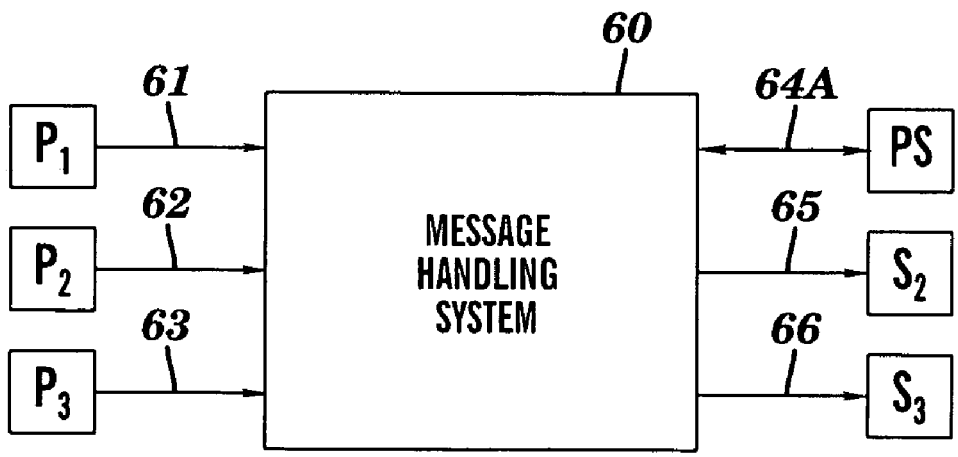
FIG. 2 depicts FIG. 1 modified by the presence of a communicator that function as both a publisher and subscriber, in accordance with embodiments of the present invention.

FIG. 2 depicts FIG. 1 modified by the presence of a communicator PS replacing the subscriber S1, wherein PS may function as both a publisher and subscriber, in accordance with embodiments of the present invention. The bidirectional arrow 64A pointing bidirectionally between PS and the message handling system 60 denotes that PS is both a subscriber and publisher.

Figure 3:
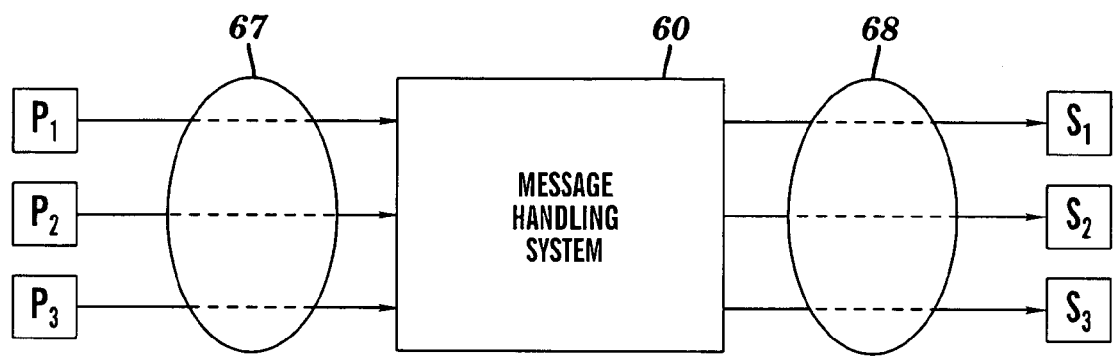
FIG. 3 depicts FIG. 1 modified by the presence of communication interfaces that respectively couple the publishers and subscribers to the message handling system, in accordance with embodiments of the present invention.
Figure 4:
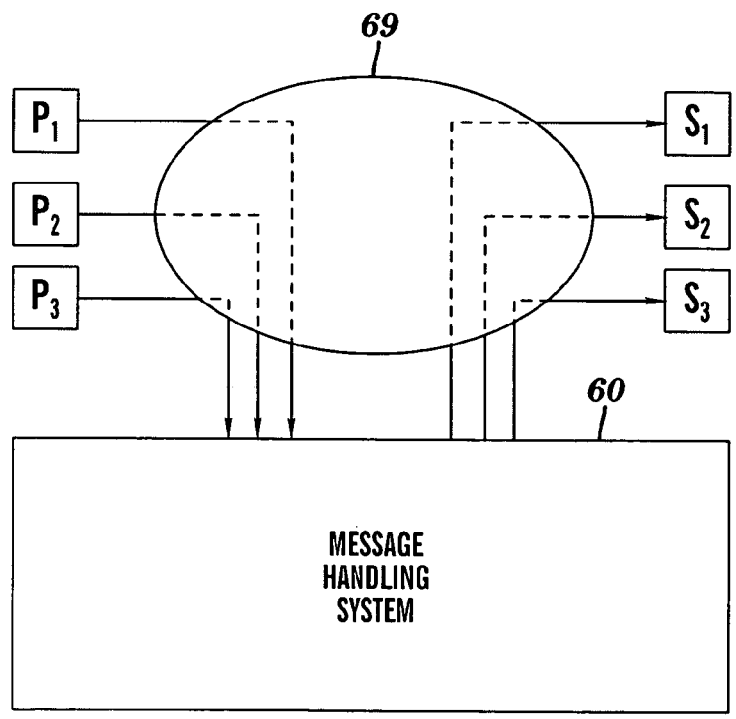
FIG. 4 depicts FIG. 1 modified by the presence of a single communication interface that couples the publishers and subscribers to the message handling system, in accordance with embodiments of the present invention.

FIG. 3 depicts FIG. 1 modified by the presence of communication interfaces 67 and 68 that respectively couple the publishers ($P_1$, $P_2$, $P_3$) and subscribers ($S_1$, $S_2$, $S_3$) to the message handling system 60, in accordance with embodiments of the present invention. The communication interface 67 and 68 may each independently comprise any communication interface or network known in the art (e.g., Internet, Intranet, Local Area Networks (LAN), Wide Area Networks (WAN), etc.) FIG. 4 depicts FIG. 1 modified by the presence of a single communication interface 69 that couples the publishers and subscribers to the message handling system 60, in accordance with embodiments of the present invention. The communication interface 69 may comprise any communication interface or network known in the art (e.g., Internet, Intranet, Local Area Networks (LAN), Wide Area Networks (WAN), etc.).

Figure 5:
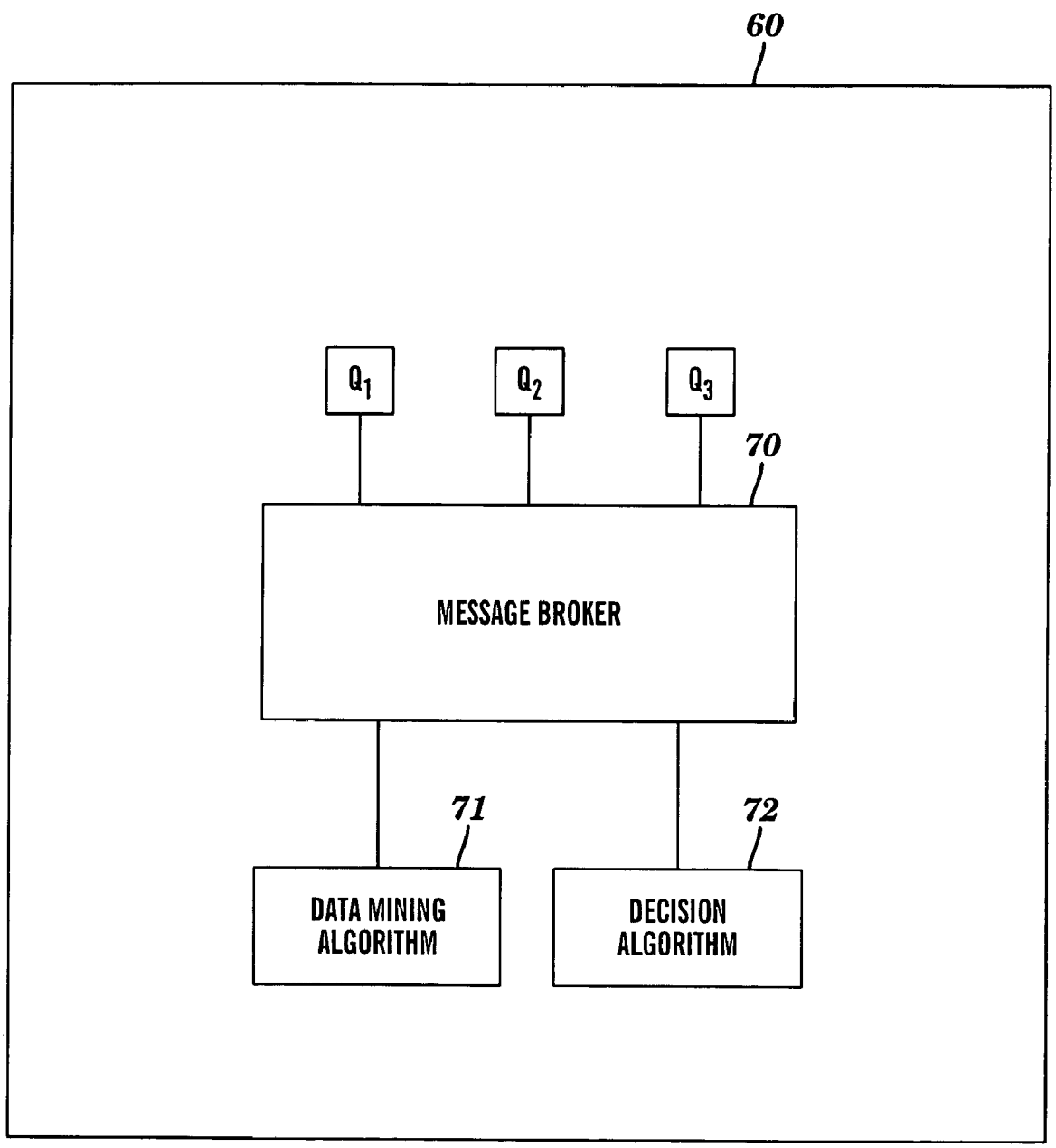
FIG. 5 depicts the message handling system of FIG. 1 comprising a message broker, queues, a data mining algorithm, and a decision algorithm, in accordance with embodiments of the present invention.

FIG. 5 depicts the message handling system 60 of FIG. 1 comprising a message broker 70, queues ($Q_1$, $Q_2$, $Q_3$), a data mining algorithm 71, and a decision algorithm 72, in accordance with embodiments of the present invention. A queue is a data storage area adapted to store data (e.g., one or more messages). The data stored in a queue may or may not be queued. The message broker 70 is coupled to the data mining algorithm 71, the decision algorithm 72, and the queues ($Q_1$, $Q_2$, $Q_3$). In FIG. 5, the data mining algorithm 71 and the decision algorithm 72 may not directly write data into the queues ($Q_1$, $Q_2$, $Q_3$) or directly read data from the queues ($Q_1$, $Q_2$, $Q_3$), but instead uses the message broker 70 as an intermediary to write data into the queues ($Q_1$, $Q_2$, $Q_3$) or to read data from the queues ($Q_1$, $Q_2$, $Q_3$). The data mining algorithm 71 implements data mining to generate at least one score, as will be described infra. The decision algorithm 72 applies at least one rule to the at least one score to generate at least one decision, as will be described infra. The queues ($Q_1$, $Q_2$, $Q_3$) are memory areas may be used to store various data (e.g., input data, data mining parameters, the at least one score, the at least one decision, etc.) as will be described infra. The queues ($Q_1$, $Q_2$, $Q_3$) may comprise persistent memory, non-persistent memory, or a combination thereof. Persistent memory retains data therein if the memory is disconnected from electrical power thereto. Non-persistent memory loses data therein if the memory is disconnected from electrical power thereto. Although FIG. 5 depicts the three queues $Q_1$, $Q_2$, $Q_3$, the present invention generally includes a plurality of queues in the message handling system 60. Although FIG. 5 depicts the data mining algorithm 71 and the decision algorithm 72 as being external to the message broker 70, the present invention includes an embodiment in which the data mining algorithm 71 and the decision algorithm 72 are contained within the message broker 70.

Figure 6:
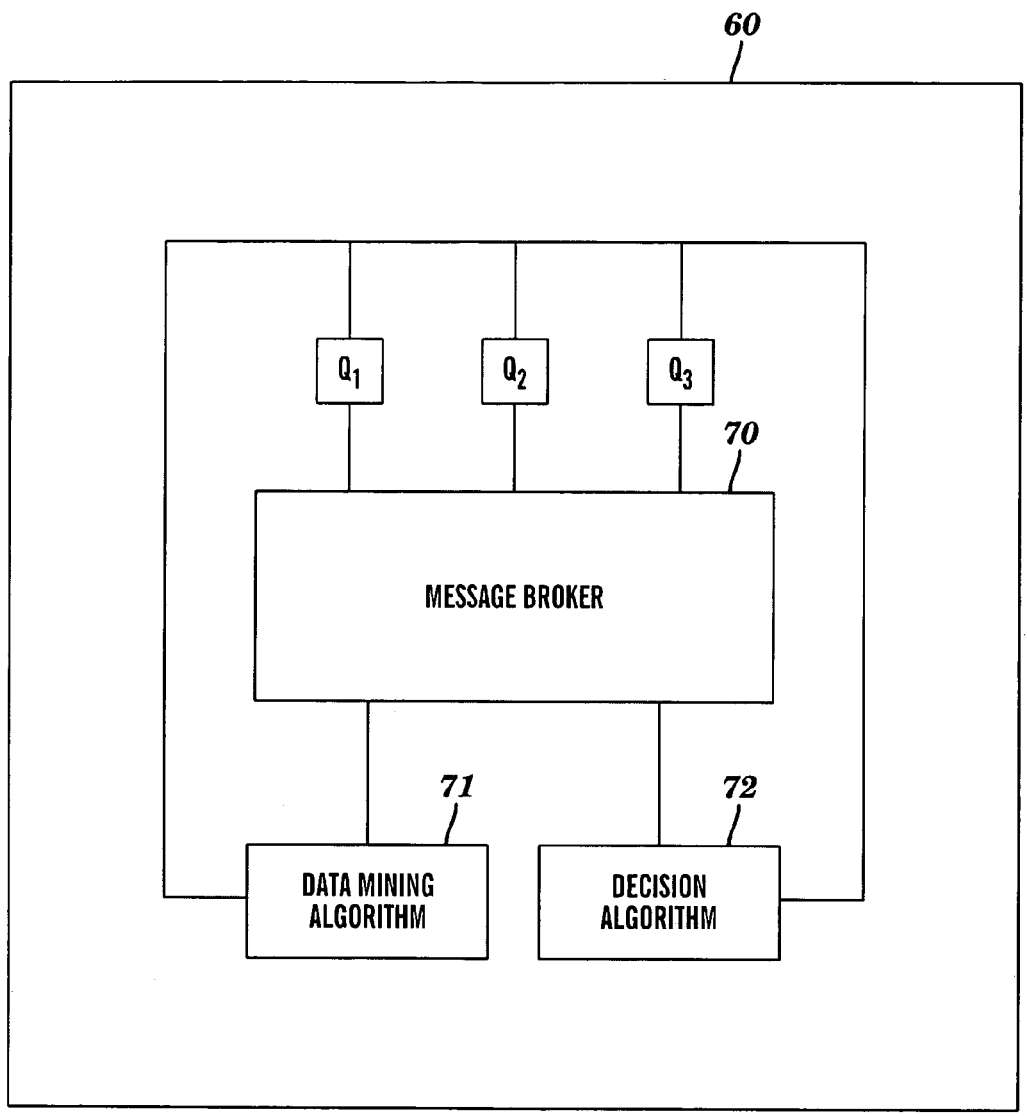
FIG. 6 depicts the message handling system of FIG. 5 with the data mining algorithm and the decision algorithm each directly coupled to the queues, in accordance with embodiments of the present invention.

FIG. 6 depicts the message handling system 60 of FIG. 5 with the data mining algorithm 71 and the decision algorithm 72 each directly coupled to the queues ($Q_1$, $Q_2$, $Q_3$), in accordance with embodiments of the present invention. In FIG. 6, the data mining algorithm 71 and the decision algorithm 72 may directly write data into the queues ($Q_1$, $Q_2$, $Q_3$) or directly read data from the queues ($Q_1$, $Q_2$, $Q_3$) without using the message broker 70 as an intermediary.

Figure 7:
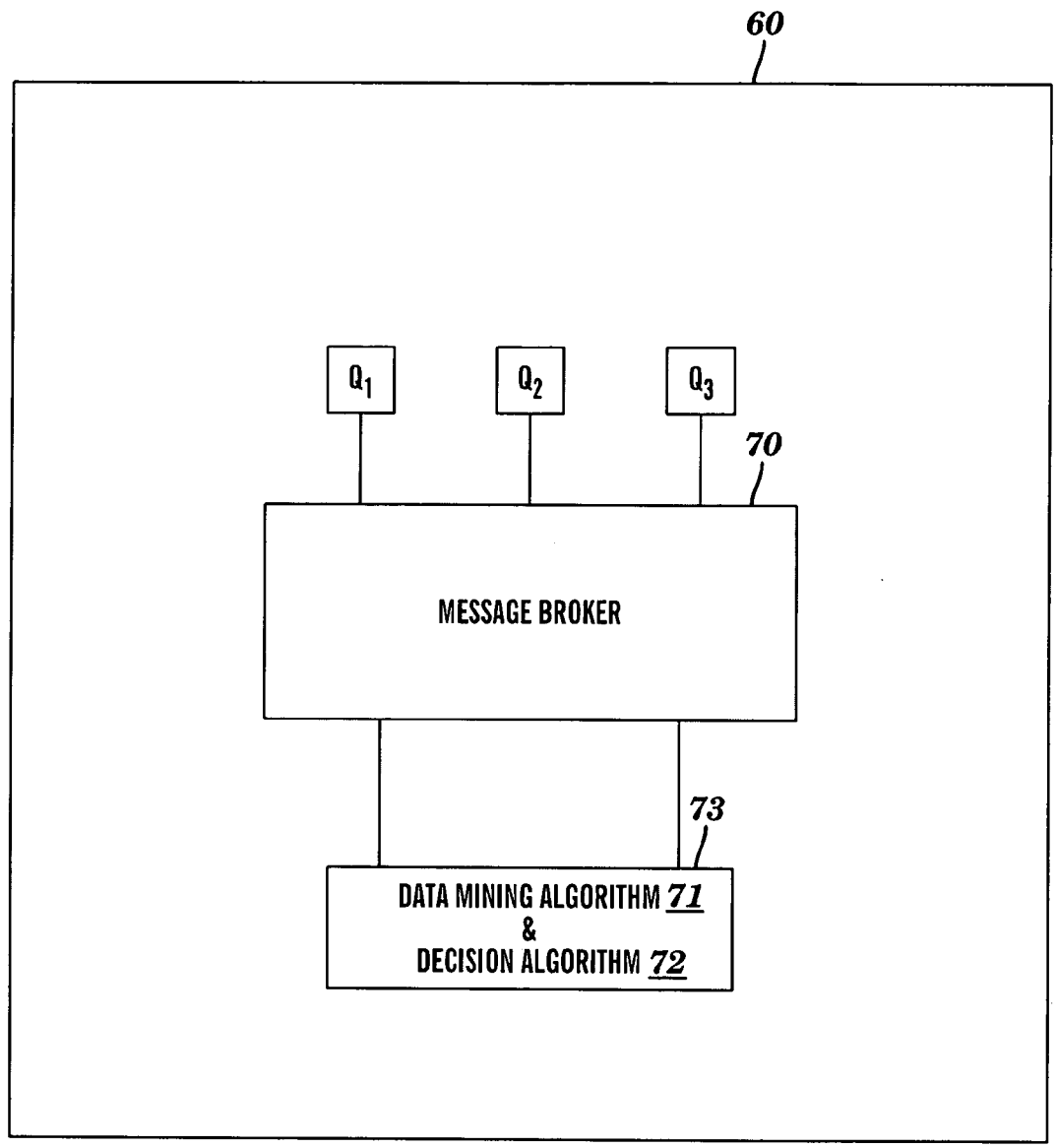
FIG. 7 depicts the message handling system of FIG. 5 with the data mining algorithm and the decision algorithm combined within a single computer program, in accordance with embodiments of the present invention.

FIG. 7 depicts the message handling system 60 of FIG. 5 with the data mining algorithm 71 and the decision algorithm 72 combined within a single computer program 73, in accordance with embodiments of the present invention. In contrast, the data mining algorithm 71 and the decision algorithm 72 of FIG. 5 are comprised by separate and distinct computer programs.

Figure 8:
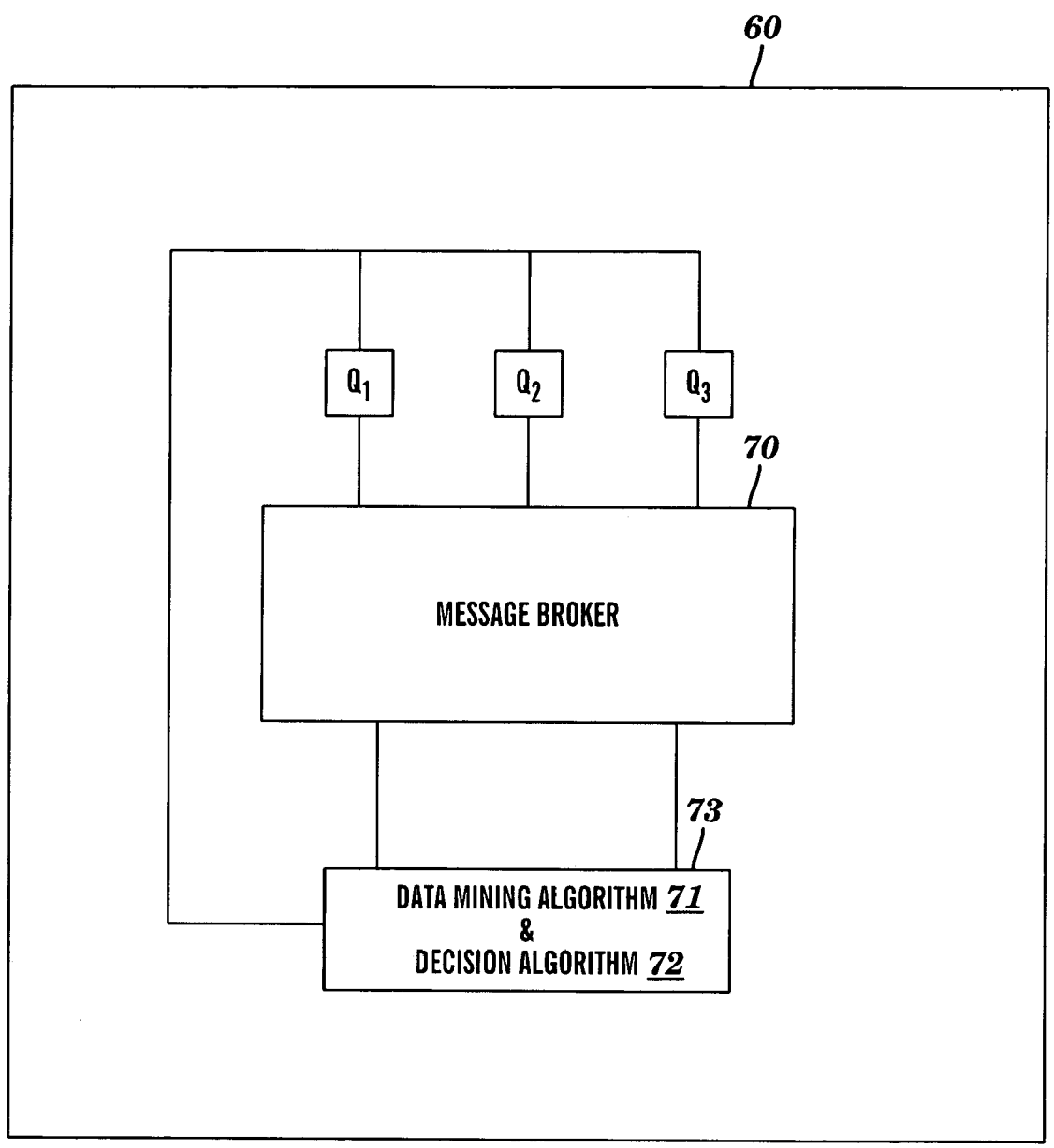
FIG. 8 depicts the message handling system of FIG. 7 such that the single computer program, which comprises the data mining algorithm and the decision algorithm, is directly coupled to the queues, in accordance with embodiments of the present invention.

FIG. 8 depicts the message handling system 60 of FIG. 7 such that the single computer program 73 (which comprises the data mining algorithm 71 and the decision algorithm 72) is directly coupled to the queues $Q_1$, $Q_2$, and $Q_3$, in accordance with embodiments of the present invention (similar to the coupling of the data mining algorithm 71 and the decision algorithm 72 to the queues $Q_1$, $Q_2$, and $Q_3$ in FIG. 6).

Figure 9:
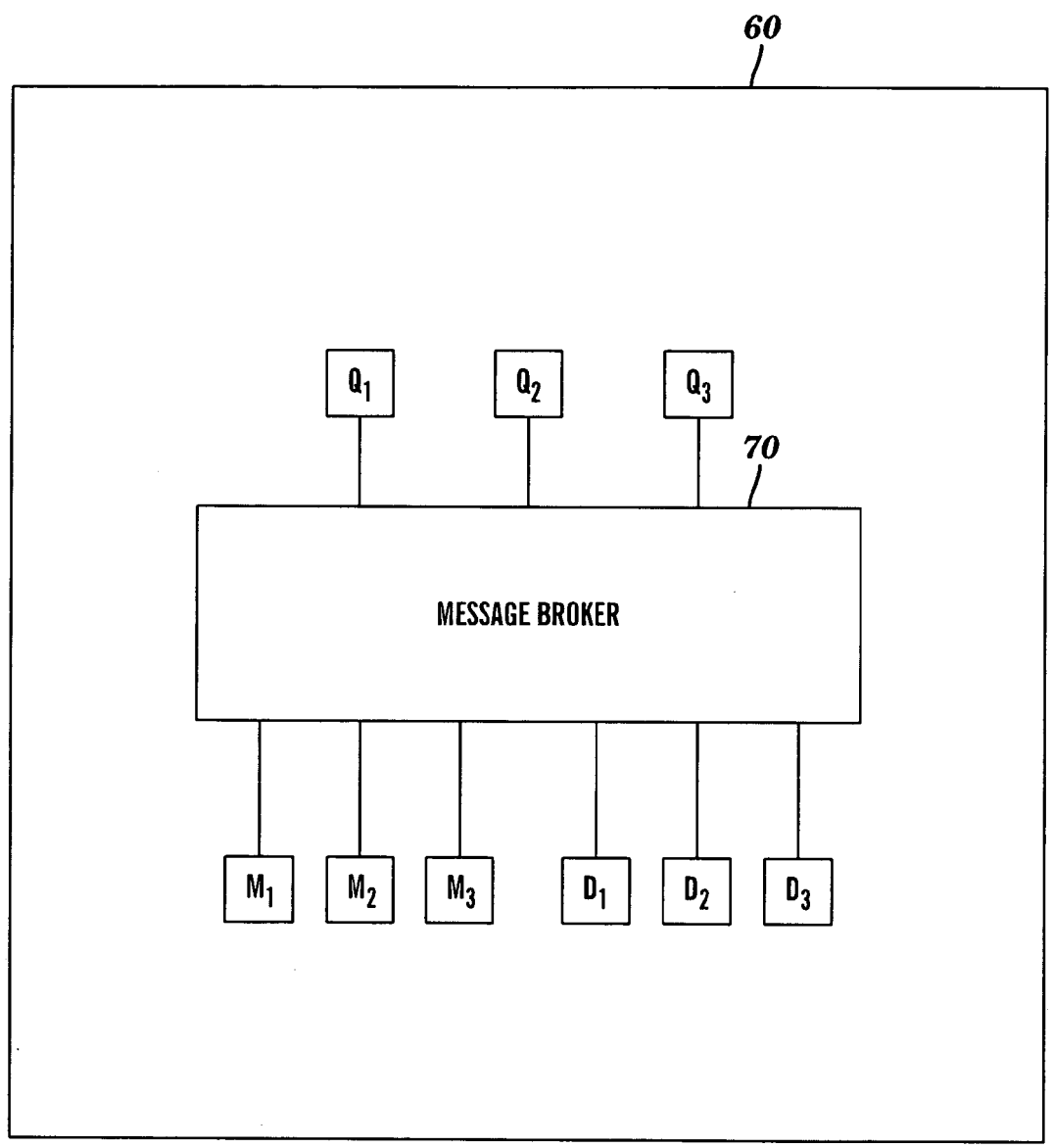
FIG. 9 depicts the message handling system of FIG. 5 with the data mining algorithm replaced by multiple data mining algorithms and the decision algorithm replaced by multiple decision algorithms, in accordance with embodiments of the present invention.

FIG. 9 depicts the message handling system 60 of FIG. 5 with the data mining algorithm 71 replaced by multiple data mining algorithms ($M_1$, $M_2$, $M_3$) and with the decision algorithm 72 replaced by multiple decision algorithms ($D_1$, $D_2$, $D_3$), in accordance with embodiments of the present invention. Although FIG. 9 depicts the data mining algorithm 71 having been replaced by the three data mining algorithms $M_1$, $M_2$, and $M_3$, the present invention generally permits the data mining algorithm 71 to be replaced by a plurality of data mining algorithms. Although FIG. 9 depicts the decision algorithm 72 having been replaced by the three decision algorithms $D_1$, $D_2$, and $D_3$, the present invention generally permits the decision algorithm 72 to be replaced by a plurality of decision algorithms.

Figure 10:
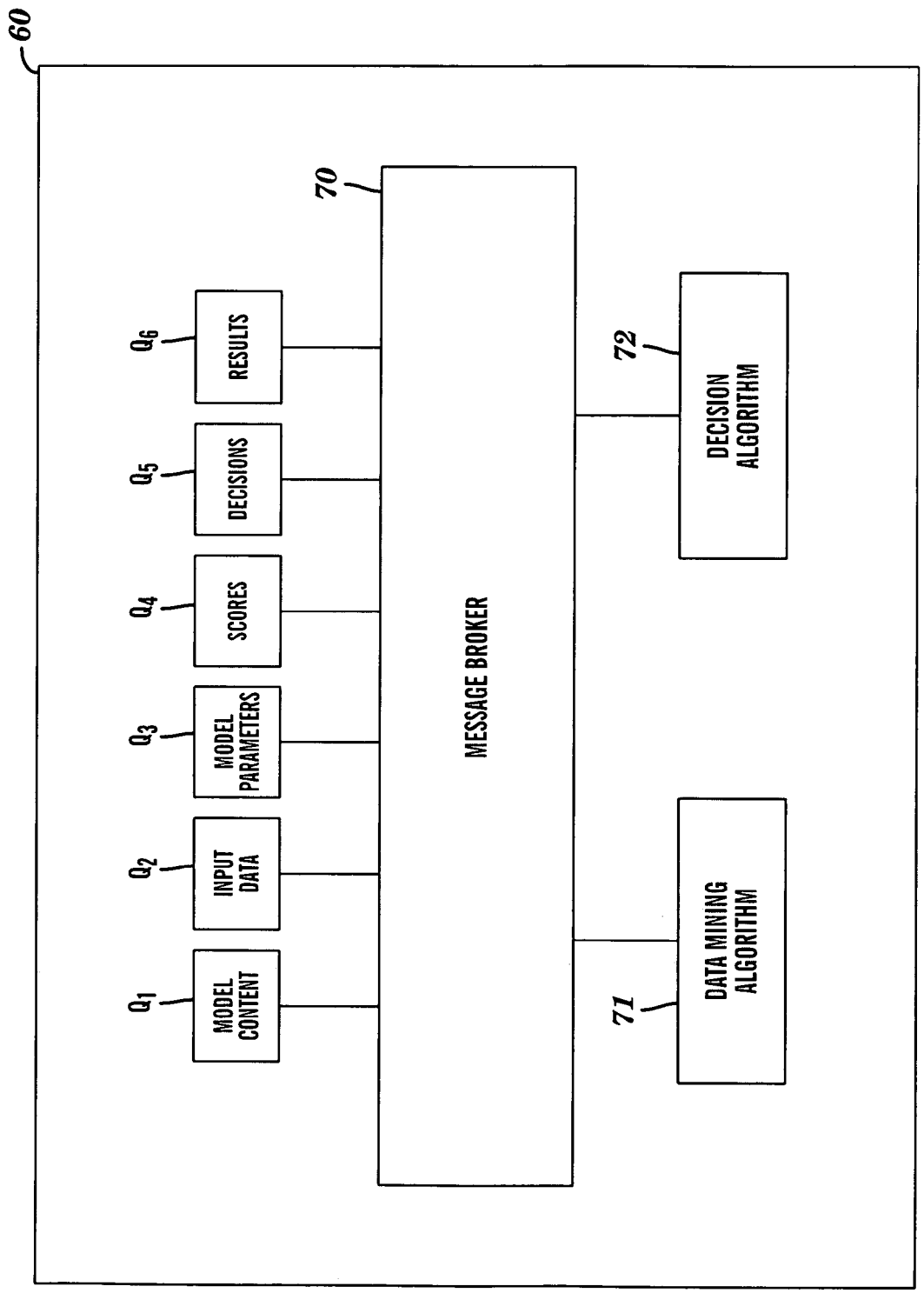
FIG. 10 depicts the message handling system of FIG. 5 with data shown in the plurality of queues, in accordance with embodiments of the present invention.

FIG. 10 depicts the message handling system of FIG. 5 with data shown in the plurality of queues, in accordance with embodiments of the present invention. FIG. 10 depicts: queue $Q_1$ comprising model content (i.e., a data mining model or an identifier thereof or a pointer thereto); queue $Q_2$ comprising input data for the data mining model; queue $Q_3$ comprising model parameters of the data mining model; queue $Q_4$ comprising at least one score generated by the data mining algorithm 71; queue $Q_5$ comprising at least one decision generated by the decision algorithm 72; and queue $Q_6$ comprising at least one result as discussed infra. The model The data mining model in queue $Q_1$ (or an identifier thereof or a pointer thereto) may comprise executable code representing any data mining model such, inter alia: a data mining model utilizing linear or nonlinear regression; a data mining model utilizing neural networks; a data mining model utilizing a decision tree; a data mining model utilizing association; a data mining model utilizing clustering; a data mining model utilizing a radial basis function (RBF) network; etc.

The data mining model may be trained or otherwise determined in any manner known to a person of ordinary skill in the art. The data mining model may be trained to a database comprising multiple data records, wherein the multiple data records are independent of one another. Each data record of the multiple data records may comprise a set of data values for a plurality of independent variables (e.g., $X_1, X_2, \ldots X_N$ in Equation (1) or (2), discussed infra) and at least one score associated with the set of data values.

The data mining model (or an identifier thereof or a pointer thereto) is published to the queue $Q_1$ of FIG. 10 by any publisher ($P_1, P_2, \ldots$) shown in FIGS. 1-4. Alternatively, the message broker 70 may train or otherwise determine the data mining model and publish the data mining model (or an identifier thereof or a pointer thereto) to the queue $Q_1$.

As an example with respect to a data mining model utilizing regression, the data mining model may be utilize a linear regression equation of the form:

$$F(X_1, X_2, \ldots X_N) = W_1 X_1 + W_2 X_2 + \ldots + W_N X_N \quad (1)$$

for expressing the function F in terms of N independent variables $X_1, X_2, \ldots X_N$ and associated weights $W_1, W_2, \ldots W_N$ such that N is a positive integer of at least 1. The input data in queue $Q_2$ may comprise the independent variables $X_1, X_2, \ldots X_N$ and may be placed in queue $Q_2$ of FIG. 10 by at least one of the publishers $P_1, P_2, \ldots$ of FIGS. 1, 2, 3, or 4. The model parameters in queue $Q_3$ may comprise the weights $W_1, W_2, \ldots W_N$ and may be placed in queue $Q_3$ of FIG. 10 by at least one of the publishers $P_1, P_2, \ldots$ of FIGS. 1, 2, 3, or 4. Generally, the model parameters in queue $Q_3$ may be constants, may be varied dynamically, or may be changed continuously. The data mining algorithm 71 operates on the data mining model and generates at least one score that is subsequently stored in queue $Q_4$ of FIG. 10. The decision algorithm 72 applies at least one rule to the at least one score to generate at least one decision that is subsequently stored in queue $Q_5$ of FIG. 10.

Alternatively, Equation (1) may be replaced by a nonlinear regression equation of the form:

$$F(X_1, X_2, \ldots X_N) = W_1 f_1(X_1) + W_2 f_2(X_2) + \ldots + W_N f_N(X_N) \quad (2)$$

in terms of functions $f_1(X_1), f_1(X_1), \ldots, f_1(X_1)$, wherein $f_i(X_i)$ is nonlinear for i being at least one of 1,2, ..., and N.

Figure 11:
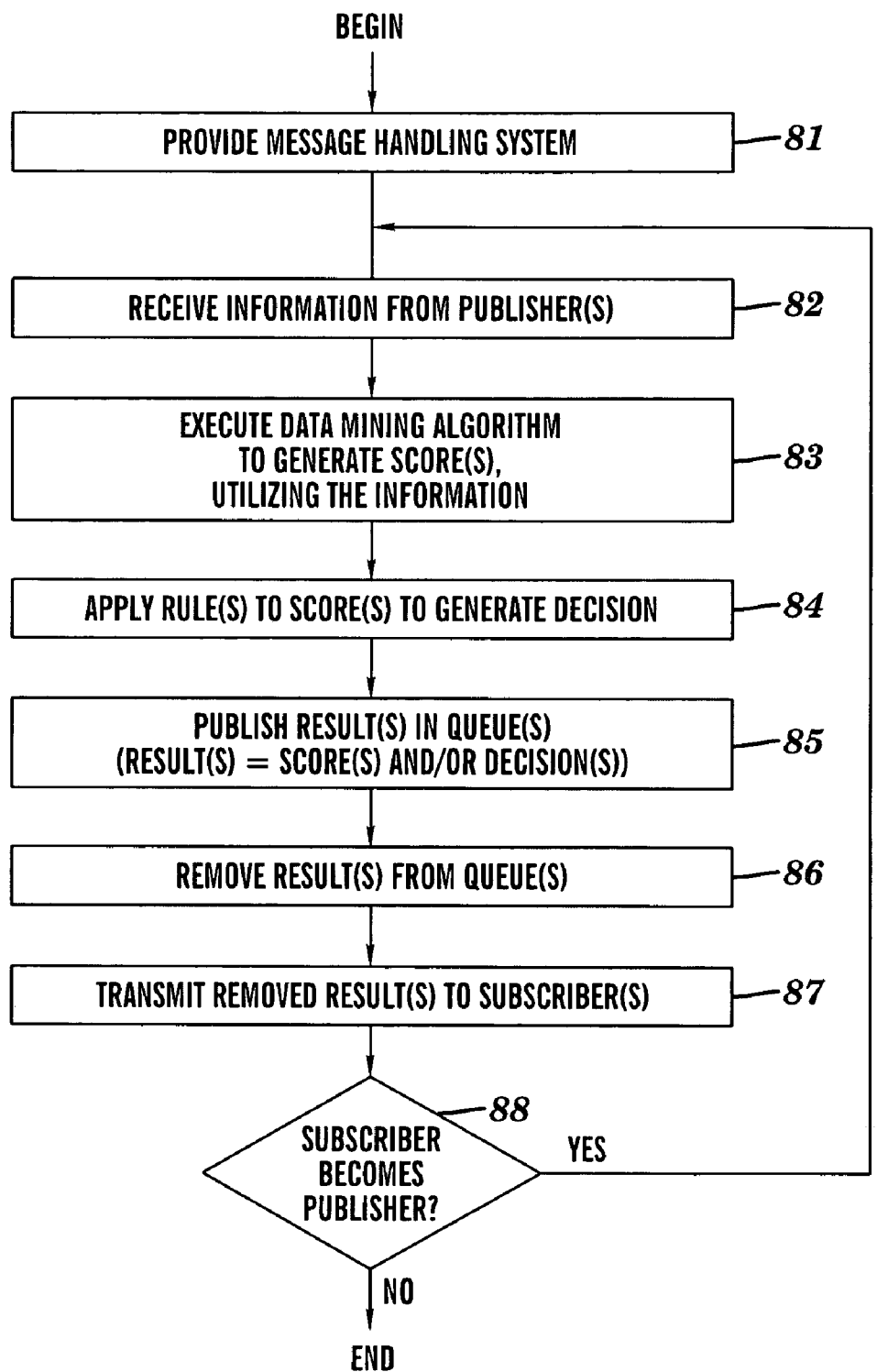
FIGS. 11 and 12 are a flow charts depicting data mining methods within a message handling system, in accordance with embodiments of the present invention.

FIG. 11 is a flow chart depicting steps 81-88 of a data mining method within the message handling system 60 of FIGS. 1-10, in accordance with embodiments of the present invention.

Step 81 provides the message handling system (e.g., message handling system 60). The message handling system comprises a message broker (e.g., message broker 70) and a plurality of queues (e.g., $Q_1, Q_2, \ldots$). The message handling system is comprised by a computer system (see FIGS. 13-15 described infra), and each queue of the plurality of queues comprises computer-readable memory. The computer-readable memory comprises persistent memory or non-persistent memory.

Step 82 receives information in at least one queue of the plurality of queues. The information is received from at least one publisher (e.g., $P_1, P_2, \ldots$) that is to the message handling system. The information may comprise model content, model parameters, input data comprising data values for a plurality of independent variables, or combinations thereof. The model content may comprise a data mining model or an identifier thereof or a pointer thereto. The model parameters may be the weights $W_1, W_2, \ldots W_N$ in Equation (1) or (2) discussed supra. Although the model parameters (e.g., weights) may not all have a same value, the scope of the present invention includes an embodiment in which the model parameters all have the same value. The independent variables may be the independent variables $X_1, X_2, \ldots X_N$ in Equation (1) or (2).

Step 83 executes a data mining algorithm by operating upon a data mining model that depends on constant parameters and on data values for independent variables. The information received in step 82 comprises input data that includes the data values for the independent variables and further includes the model parameters, model content, or combinations thereof. The model content is the data mining model or an identifier thereof or a pointer thereto. The data mining model may alternatively originate from a source other than from a publisher of the at least one publisher and may reside in a memory other than a queue of the at least one queue. Step 83 extracts the content needed for the data mining algorithm from the information in the at least one queue. Step 83 utilizes the extracted content to generate the at least one score. Extracting may comprise parsing the needed content to isolate the needed content. Step 83 may update the data values for the independent variables based on the input data.

Step 84 applies at least one rule to the at least one score to generate at least one decision.

Step 85 publishes at least one result in a result queue (e.g., result queue $Q_6$ of FIG. 10) of the plurality of queues. The result queue may be any queue of the plurality of queues. The at least one result may comprise, or consist of, the at least one score, the at least one decision, and combinations thereof. The result queue is subscribed to by at least one subscriber.

Step 86 removes the at least one result from the result queue such as by emptying the at least one result from the result queue.

Step 87 transmits the removed at least one result to at least one subscriber (e.g., by E-mail) by transmitting the at least one result emptied from the result queue in step 86 to the at least one subscriber.

Figure 12:
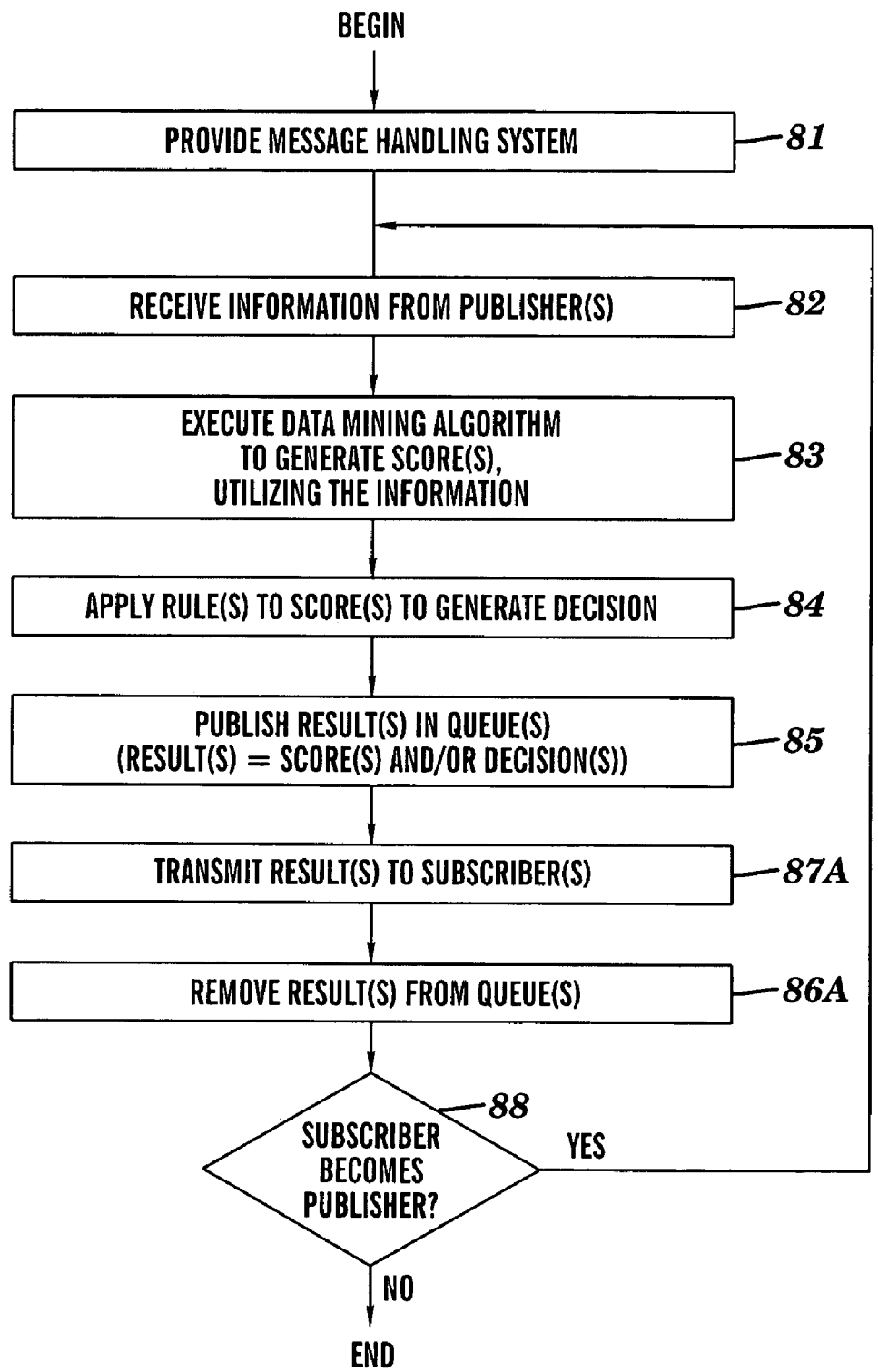

Alternatively in FIG. 12, steps 86 and 87 of FIG. 11 appear in a reverse sequence and are respectively replaced by steps 86A and 87A in FIG. 12, in accordance with embodiments of the present invention. In FIG. 12, step 87A transmits the at least one result directly from the result queue to the at least one subscriber before the at least one result is removed (i.e., deleted) from the result queue in step 86A.

Step 88 in FIG. 11 or 12 determines whether a subscriber (e.g. subscriber PS of FIG. 2) next becomes a publisher adapted to publish information to the at least one queue in step 82. If step 88 determines that a subscriber does not next become a publisher, then the method ends. If step 88 determines that a subscriber does next becomes a publisher, then the method loops back to step 82 to iteratively performs steps 82-88 until step 88 determines that a subscriber does not next become a publisher.

Some or all of steps 82-87 of FIG. 11, and of steps 82-85, 87A, and 86A of FIG. 12, may be performed by the message broker. Any step in FIGS. 11 and 12 may be performed by a processor of a computer system such as the computer systems described in FIGS. 13-15.

In FIGS. 11-12, steps 83-85 may be performed/implemented in real time responsive to step 82. In FIG. 11, steps 86-87 may be performed in real time responsive to step 85. In FIG. 12, steps 87A and 86A may be performed/implemented in real time responsive to step 85. Generally, step Z is said to be performed/implemented in real time responsive to step Y if step Z is performed/implemented immediately after step Y is performed/implemented (e.g., without any programmed delay and without performing/implementing any intervening process steps other than trivial bookkeeping steps). If steps $Z_1, Z_2, \ldots, Z_{N-1}, Z_N$ are performed/implemented sequentially in real time responsive to step Y, then: step $Z_1$ is performed/implemented in real time responsive to step Y, step $Z_2$ is performed/implemented in real time responsive to step $Z_1, \ldots$, and step $Z_N$ is performed/implemented in real time responsive to step $Z_{N-1}$.

An example of how the data mining method may be used is for identifying potential purchasers of merchandise. The merchandise in this example can be of four types: jewelry, scarves, handbags, and shoes. A publisher publishes into a queue, for a single customer, the customer identification (ID) and the quantity of jewelry, scarves, handbags, shoes purchased in a specific purchase by the customer. An independent variable to be updated in a queue is the total purchased to date (in dollars) of each of jewelry, scarves, handbags, and shoes. If the total purchased to date of shoes is zero, a subscriber (e.g., a shoe manufacturer or shoe retailer) may desire to predict the customer's propensity to purchase shoes in the future, which may be accomplished by use of the data mining algorithm within the message handling system of the present invention as described supra.

Another example of how the data mining method may be used is with respect to credit card fraud. Mobile phone use Subscriber Identity Module (SIM) cards which serve to identifies the mobile phone. A thief may fraudulently take the SIM card from mobile phone A and put the SIM card in mobile phone B. The present invention may be used to detect this fraud. A completed call generates a message ("call detail record") to the message handling system. A call monitoring system (e.g., relay station) publishes the call detail record of the call. The call detail record is published to a queue of the message broker of the message handling system. The call detail record may include: ID of SIM card, cell mast ID, telephone number called, start time, end time to the broker. The cell mast ID identifies the relay station. The message broker has a stored table denoting latitude and longitude of each cell mast ID. The message broker has a profile record for each SIM card having fields: SIM card ID, latitude, longitude, time call completed. The thief makes a first phone call in a first geographical location and a second phone call in a second geographical location. When the mobile phone is used for the second phone call, a new call detail record is generated and published to a queue of the message handling system and a new profile record is generated by the message broker. The message broker calculates a distance D between the relay stations of the first and second phone calls. The message broker calculates the time difference $\Delta t$ between end of first phone call and start of second phone call, using the latitude and longitude of the first and second geographical locations. The message broker calculates a minimum velocity $V=D/\Delta t$ of movement from the first geographical location to the second geographical location. If V exceeds a predetermined threshold velocity $V_T$, then there may have been a SIM card theft. The message broker publishes the existence of the possible theft in a message queue and the existence of the possible theft is then transmitted to the pertinent subscriber(s) (e.g., a central billing system).

Figure 13:
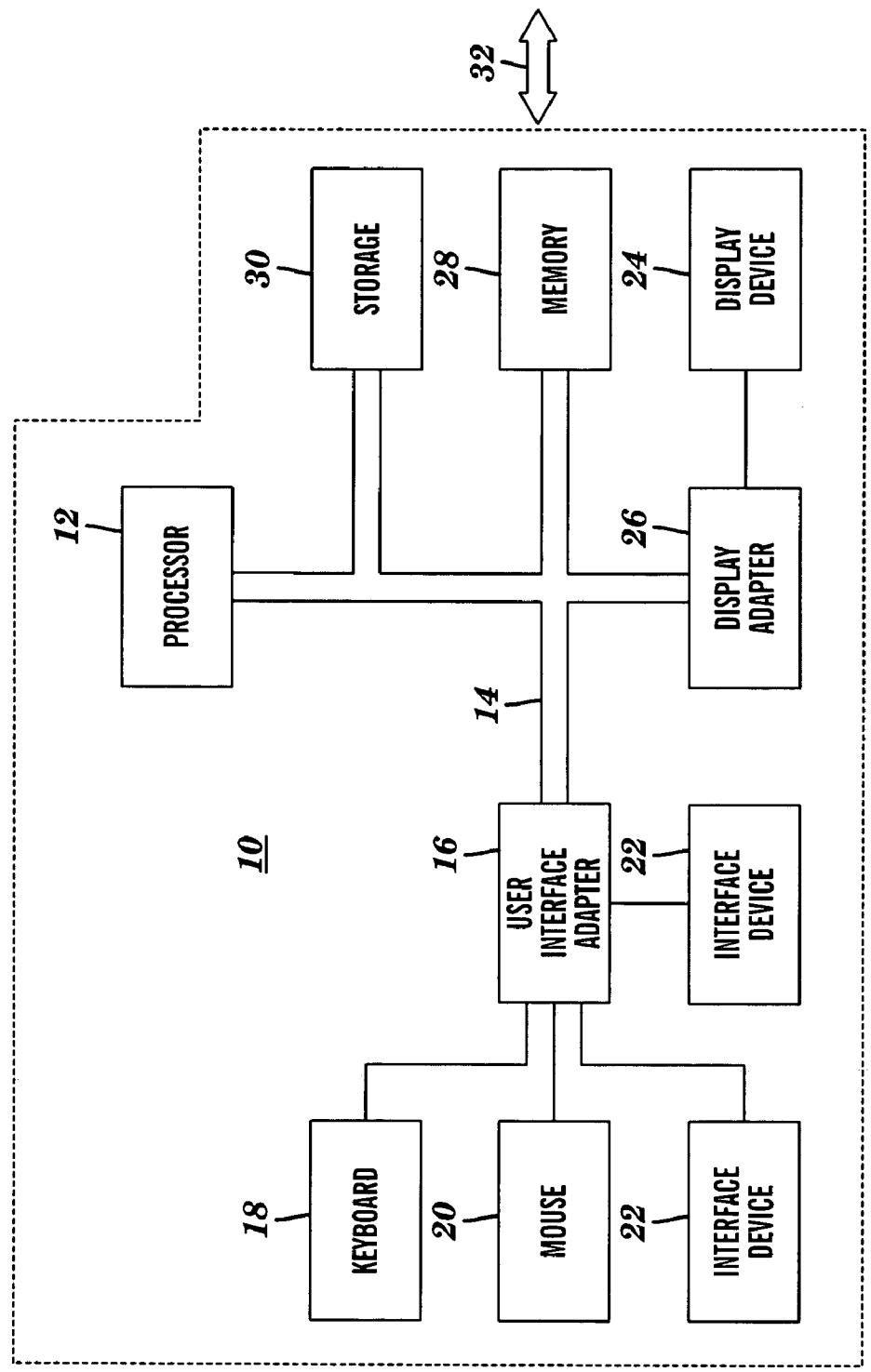
FIG. 13 depicts a data processing system used for implementing a data mining method within a message handling system, in accordance with embodiments of the present invention.

FIG. 13 depicts a data processing system used for implementing a data mining method within a message handling system, in accordance with embodiments of the present invention. FIG. 13 illustrates a representative workstation hardware environment, wherein the workstation hardware environment of FIG. 13 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 may includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc. The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc.

Figure 14:
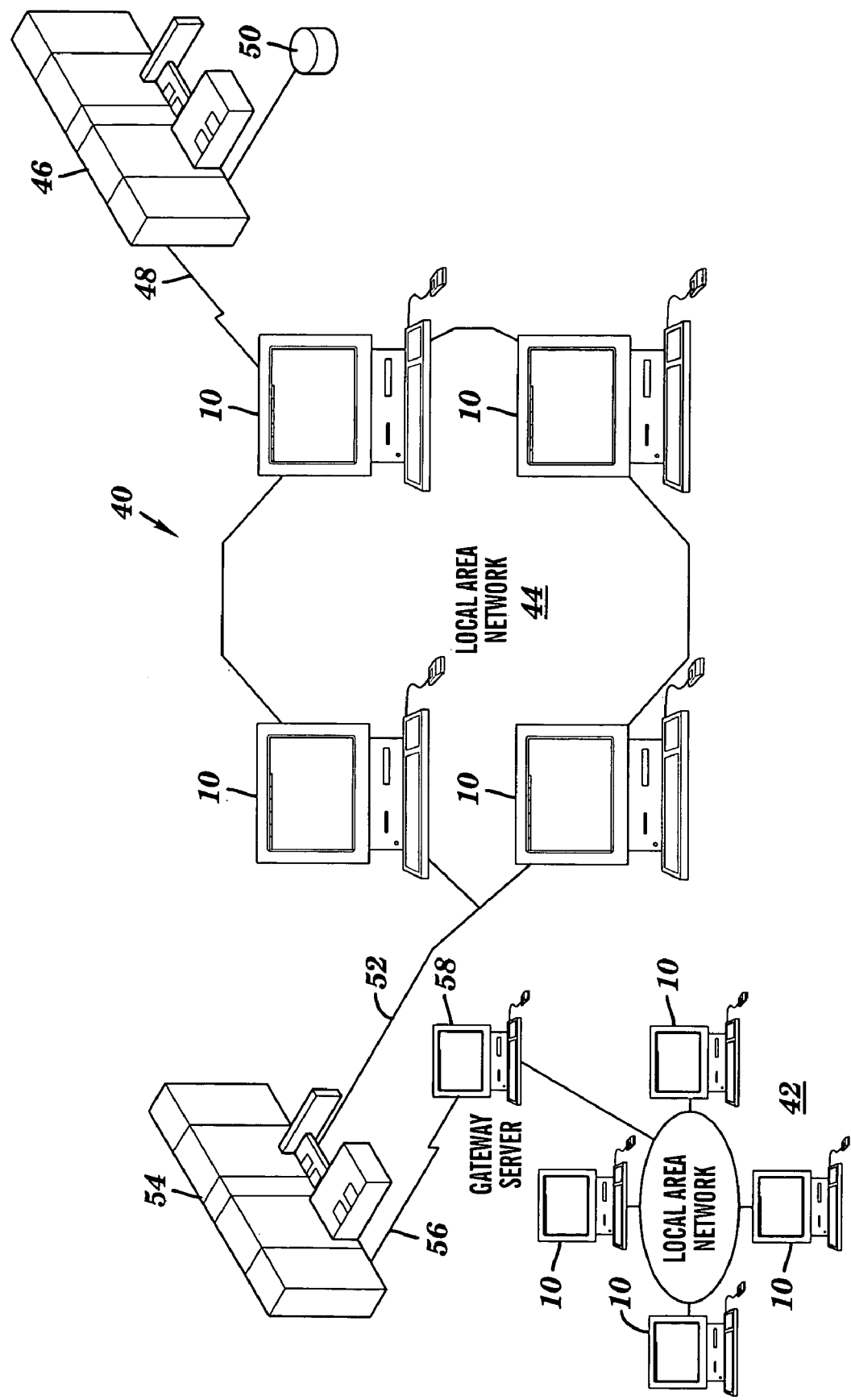
FIG. 14 depicts a data processing network for implementing a data mining method within a message handling system, in accordance with embodiments of the present invention.

FIG. 14 depicts a data processing network for implementing a data mining method within a message handling system, in accordance with embodiments of the present invention. FIG. 14 illustrates a data processing network 40 which includes a plurality of individual networks, including LANs 42 and 44, each of which includes a plurality of individual workstations 10. Alternatively, as those skilled in the art will appreciate, a LAN may comprise a plurality of intelligent workstations coupled to a host processor. The data processing network 40 may also include multiple mainframe computers, such as a mainframe computer 46, which may be coupled to the LAN 44 by means of a communications link 48

The mainframe computer 46 may also be coupled to a storage device 50, which may serve as remote storage for the LAN 44. The storage device 50 may include the queues (e.g., $Q_1, Q_2, \ldots, Q_6$ of FIGS. 5-10). The LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44. The mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention may be stored in permanent storage of some type, such as the permanent storage 30 of the workstation 10 (see FIGS. 13-14). In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein. The software code may include the message broker 70 (see FIGS. 5-10). The software code may include the data mining algorithm 71 (see FIGS. 5-8 and 10) and/or the data mining algorithms $M_1$, $M_2$, $M_3$ (see FIG. 9). The software code may include the decision algorithm 72 (see FIGS. 5-8 and 10) and/or the decision algorithms $D_1$, $D_2$, $D_3$ (see FIG. 9).

Figure 15:
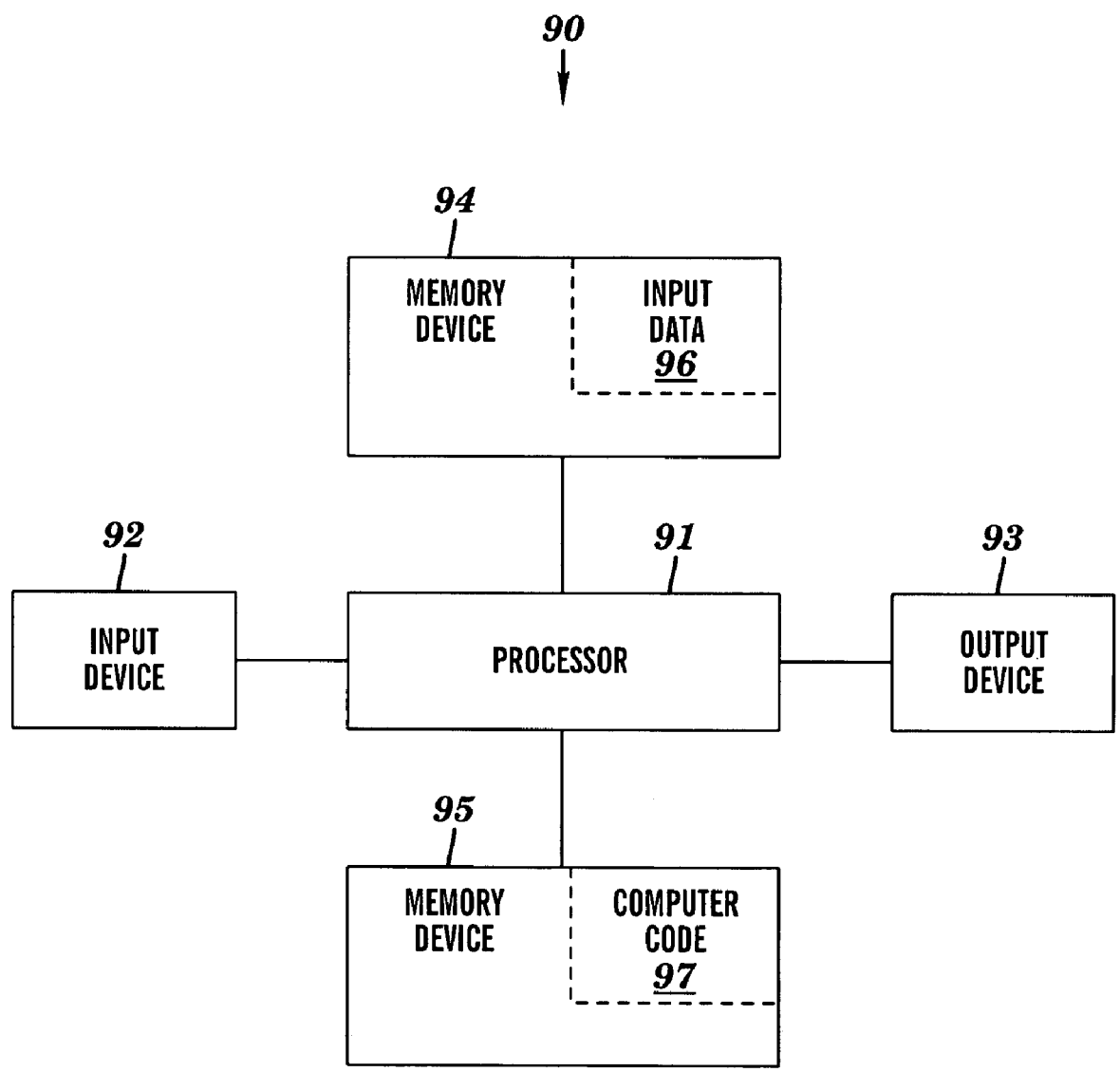
FIG. 15 depicts a computer system used for implementing data mining method within a message handling system, in accordance with embodiments of the present invention.

FIG. 15 depicts a computer system 90 used for implementing a data mining method within a message handling system, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 may include a computer code 97 which is the same as, or analogous to, the software code described supra in conjunction with FIGS. 13-14. The computer code 97 may include the message broker 70 (see FIGS. 5-10). The computer code 97 may include the message broker 70 (see FIGS. 5-10). The computer code 97 may include the data mining algorithm 71 (see FIGS. 5-8 and 10) and/or the data mining algorithms $M_1$, $M_2$, $M_3$ (see FIG. 9). The computer code 97 may include the decision algorithm 72 (see FIGS. 5-8 and 10) and/or the decision algorithms $D_1$, $D_2$, $D_3$ (see FIG. 9).

The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 15) may be used as a computer usable medium (or a computer readable medium or a program storage device) having a computer readable program code embodied therein and/or having other data stored therein, wherein the computer readable program code comprises the computer code 97. Either or both memory devices 94 and 95 (or one or more additional memory devices not shown in FIG. 15) may be used for the queues (e.g., $Q_1$, $Q_2$, ..., $Q_6$ of FIGS. 5-10). Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for data mining.

While FIG. 15 shows the computer system 90 as a particular configuration of hardware and software, any configuration of hardware and software, as would be known to a person of ordinary skill in the art, may be utilized for the purposes stated supra in conjunction with the particular computer system 90 of FIG. 15. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A data mining method adapted to be performed in a computer system having a message handling system therein, said message handling system comprising a message broker and a plurality of queues that include computer-readable memory, said method comprising:

receiving information in at least one queue of the plurality of queues, said information being received from at least one publisher;

executing a data mining algorithm by operating upon a data mining model that depends on model parameters and on data values for independent variables, said information comprising input data that includes the data values and further includes the model parameters, model content, or combinations thereof, said model content being the data mining model or an identifier thereof or a pointer thereto, said executing comprising utilizing the information to generate at least one score;

executing a decision algorithm to apply at least one rule to the at least one score to generate at least one decision;

publishing at least one result in a result queue of the plurality of queues, said at least one result being selected from the group consisting of the at least one score, the at least one decision, and combinations thereof, said result queue being subscribed to by at least one subscriber; and transmitting the at least one result from the result queue to the at least one subscriber, wherein said receiving, said executing the data mining algorithm, said executing the decision algorithm, said publishing, and said transmitting are performed by the message broker, wherein the data mining model is a linear or nonlinear regression model such that the model parameters comprise weights respectively associated with the independent variables, wherein a positive integer N is a total number of said independent variables denoted as $X_1, X_2, \ldots, X_N$;

wherein said weights consist of N weights denoted as $W_1, W_2, \ldots, W_N$;

wherein the data mining model is said linear regression model comprising a function $F(X_1, X_2, \ldots, X_N)$ expressed in terms of a linear regression equation having a form of:

$$F(X_1, X_2, \ldots, X_N) = W_1 X_1 + W_2 X_2 + \ldots + W_N X_N.$$

2. The method of claim 1, wherein the data mining algorithm and the decision algorithm are each not configured to write data directly into the plurality of queues but are each configured to write data into the plurality of queues via use of the message broker as an intermediary between the plurality of queues and both the data mining algorithm and the decision algorithm.

3. The method of claim 1, wherein the data mining algorithm and the decision algorithm are each configured to write data directly into the plurality of queues without using the message broker as an intermediary between the plurality of queues and both the data mining algorithm and the decision algorithm.

4. The method of claim 1, wherein the method further comprises removing the at least one result from the result queue, and wherein said removing and transmitting are performed sequentially in real time responsive to said publishing.

5. The method of claim 1, said method further comprising after said transmitting: repeating said receiving, executing, applying, publishing, and transmitting such that said information pertinent to said repeating is information from a first subscriber of the at least one subscriber in response to said subscriber having received the at least one result from said transmitting, said first subscriber being a publisher of the at least one publisher.

6. A data mining method adapted to be performed in a computer system having a message handling system therein, said message handling system comprising a message broker and a plurality of queues that include computer-readable memory, said method comprising:

receiving information in at least one queue of the plurality of queues, said information being received from at least one publisher;

executing a data mining algorithm by operating upon a data mining model that depends on model parameters and on data values for independent variables, said information comprising input data that includes the data values and further includes the model parameters, model content, or combinations thereof, said model content being the data mining model or an identifier thereof or a pointer thereto, said executing comprising utilizing the information to generate at least one score;

executing a decision algorithm to apply at least one rule to the at least one score to generate at least one decision;

publishing at least one result in a result queue of the plurality of queues, said at least one result being selected from the group consisting of the at least one score, the at least one decision, and combinations thereof, said result queue being subscribed to by at least one subscriber; and transmitting the at least one result from the result queue to the at least one subscriber, wherein said receiving, said executing the data mining algorithm, said executing the decision algorithm, said publishing, and said transmitting are performed by the message broker, wherein the data mining model is a linear or nonlinear regression model such that the model parameters comprise weights respectively associated with the independent variables, wherein a positive integer N is a total number of said independent variables denoted as $X_1, X_2, \ldots, X_N$;

wherein said weights consist of N weights denoted as $W_1, W_2, \ldots, W_N$;

wherein the data mining model is said nonlinear regression model comprising a function $F(X_1, X_2, \ldots, X_N)$ expressed in terms of a nonlinear regression equation having a form of:

$$F(X_1, X_2, \ldots, X_N) = W_1 f_1(X_1) + W_2 f_2(X_2) + \ldots + W_n f_n(X_N);$$

wherein $f_1(X_1), f_2(X_2), \ldots f_N(X_N)$ are nonlinear functions of $X_1, X_2, \ldots X_N$, respectively.

7. The method of claim 6, wherein the data mining algorithm and the decision algorithm are each not configured to write data directly into the plurality of queues but are each configured to write data into the plurality of queues via use of the message broker as an intermediary between the plurality of queues and both the data mining algorithm and the decision algorithm.

8. The method of claim 6, wherein the data mining algorithm and the decision algorithm are each configured to write data directly into the plurality of queues without using the message broker as an intermediary between the plurality of queues and both the data mining algorithm and the decision algorithm.

9. The method of claim 6, wherein the method further comprises removing the at least one result from the result queue, and wherein said removing and transmitting are performed sequentially in real time responsive to said publishing.

10. The method of claim 6, said method further comprising after said transmitting: repeating said receiving, executing, applying, publishing, and transmitting such that said information pertinent to said repeating is information from a first subscriber of the at least one subscriber in response to said subscriber having received the at least one result from said transmitting, said first subscriber being a publisher of the at least one publisher.

11. A data mining method adapted to be performed in a computer system having a message handling system therein, said message handling system comprising a message broker and a plurality of queues that include computer-readable memory, said method comprising:

receiving information in at least one queue of the plurality of queues, said information being received from at least one publisher;

executing a data mining algorithm by operating upon a data mining model that depends on model parameters and on data values for independent variables, said information comprising input data that includes the data values and further includes the model parameters, model content, or combinations thereof, said model content being the data mining model or an identifier thereof or a pointer thereto, said executing comprising utilizing the information to generate at least one score;

executing a decision algorithm to apply at least one rule to the at least one score to generate at least one decision;

publishing at least one result in a result queue of the plurality of queues, said at least one result being selected from the group consisting of the at least one score, the at least one decision, and combinations thereof, said result queue being subscribed to by at least one subscriber; and transmitting the at least one result from the result queue to the at least one subscriber, wherein said receiving, said executing the data mining algorithm, said executing the decision algorithm, said publishing, and said transmitting are performed by the message broker, wherein the at least one queue comprises six distinct queues consisting of a first queue, a second queue, a third queue, a fourth queue, a fifth queue, and a sixth queue consisting of the result queue, and wherein the method further comprises:

storing the data mining model or the identifier thereof in the first queue;

storing the input data values in the second queue;

storing the model parameters m the third queue;

storing the at least one score in the fourth queue;

storing the at least one decision in the fifth queue.

* * * * *